United States Patent [19]

(12) United States Patent
Medapalli (10) Patent No.: US 9,560,584 B2
(45) Date of Patent: Jan. 31, 2017

(54) MOBILE DEVICE WITH CELLULAR-WLAN OFFLOAD USING PASSIVE LOAD SENSING OF WLAN

(71) Applicant: Broadcom Corporation, Irvine, CA (US)

(72) Inventor: Kamesh Medapalli, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 188 days.

(21) Appl. No.: 14/149,390

(22) Filed: Jan. 7, 2014

(65) Prior Publication Data

US 2014/0192642 A1    Jul. 10, 2014

Related U.S. Application Data

(60) Provisional application No. 61/750,283, filed on Jan. 8, 2013.

(51) Int. Cl.
*H04W 4/00* (2009.01)
*H04W 48/18* (2009.01)
*H04W 28/02* (2009.01)

(52) U.S. Cl.
CPC ............ *H04W 48/18* (2013.01); *H04W 28/02* (2013.01); *H04W 28/0205* (2013.01)

(58) Field of Classification Search
CPC ... H04W 28/02; H04W 28/0205; H04W 48/18
USPC ................. 370/230, 252, 231, 329
See application file for complete search history.

(56) References Cited

U.S. PATENT DOCUMENTS

| 6,574,474 B1* | 6/2003 | Nielsen | H04W 48/20 455/433 |
|---|---|---|---|
| 2005/0153704 A1* | 7/2005 | Luss | H04W 16/18 455/453 |
| 2008/0233967 A1* | 9/2008 | Montojo | H04W 72/082 455/452.2 |
| 2010/0208634 A1* | 8/2010 | Eng | H04L 45/00 370/310 |
| 2010/0296499 A1* | 11/2010 | Karaoguz | H04L 12/4625 370/338 |
| 2010/0303008 A1* | 12/2010 | Wietfeldt | H04W 76/025 370/328 |
| 2010/0304738 A1* | 12/2010 | Lim | H04W 36/30 455/426.1 |

(Continued)

OTHER PUBLICATIONS

Medepalli, K., et al., "Throughput Analysis of IEEE 802.11 Wireless LANs using an Average Cycle Time Approach," Proceedings of IEEE Globecom 2005; pp. 3007-3011.

*Primary Examiner* — Farah Faroul
(74) *Attorney, Agent, or Firm* — Sterne, Kessler, Goldstein & Fox PLLC (57) ABSTRACT

Apparatus and methods are provided for switching between a wireless local area network (LAN) and a cellular network for a user equipment's (UE) data communication by passively sensing the load on the wireless LAN. A method is disclosed that includes detecting an access point associated with a wireless LAN and receiving packets that are transmitted by other devices that are using the wireless LAN. The method can further include examining the received packets to estimate a data load of the wireless LAN and selecting between the wireless LAN and a cellular network based on the estimated data load.

20 Claims, 5 Drawing Sheets

(56) References Cited

U.S. PATENT DOCUMENTS

| | | | | |
|---|---|---|---|---|
| 2011/0119565 A1* | 5/2011 | Chang | H03M 13/1515 | 714/776 |
| 2012/0039175 A1* | 2/2012 | Sridhar | H04L 47/125 | 370/236 |
| 2012/0238287 A1* | 9/2012 | Scherzer | H04W 48/16 | 455/456.1 |
| 2013/0022024 A1* | 1/2013 | Chu | H04W 36/0055 | 370/332 |
| 2013/0029630 A1* | 1/2013 | Salkini | H04L 63/10 | 455/404.1 |
| 2013/0078985 A1* | 3/2013 | Savolainen | H04L 29/12952 | 455/418 |
| 2013/0121145 A1* | 5/2013 | Draznin | H04L 12/5692 | 370/230 |
| 2013/0163424 A1* | 6/2013 | Goerke | H04W 24/02 | 370/235 |
| 2013/0163463 A1* | 6/2013 | Grayson | H04L 43/0876 | 370/253 |
| 2013/0201842 A1* | 8/2013 | Chou | H04W 28/08 | 370/252 |
| 2014/0003239 A1* | 1/2014 | Etemad | H04W 28/08 | 370/235 |
| 2014/0031054 A1* | 1/2014 | Zou | H04W 16/14 | 455/452.2 |
| 2014/0078973 A1* | 3/2014 | Kazmi | H04W 8/22 | 370/329 |
| 2014/0082046 A1* | 3/2014 | Tal | H04L 43/0882 | 709/203 |
| 2014/0185535 A1* | 7/2014 | Park | H04W 74/04 | 370/329 |
| 2014/0201212 A1* | 7/2014 | Qi | H04L 67/303 | 707/741 |
| 2014/0334318 A1* | 11/2014 | Pica | H04W 36/14 | 370/252 |
| 2015/0085659 A1* | 3/2015 | Hong | H04W 76/023 | 370/235 |
| 2015/0092552 A1* | 4/2015 | Bajj | H04W 28/08 | 370/235 |
| 2015/0117238 A1* | 4/2015 | Kronestedt | H04W 24/10 | 370/252 |
| 2015/0223106 A1* | 8/2015 | Van Phan | H04L 29/14 | 370/225 |
| 2015/0271077 A1* | 9/2015 | Mustajarvi | H04L 47/125 | 370/235 |
| 2016/0073287 A1* | 3/2016 | Himayat | H04W 48/18 | 370/236 |

* cited by examiner

MOBILE DEVICE WITH CELLULAR-WLAN OFFLOAD USING PASSIVE LOAD SENSING OF WLAN

CROSS REFERENCE TO RELATED APPLICATIONS

The present application claims priority to U.S. Provisional Patent Application No. 61/750,283, filed on Jan. 8, 2013, which is hereby expressly incorporated by reference in its entirety.

BACKGROUND

Field

The present disclosure relates generally to methods and systems for switching between a wireless local area network (LAN) and a cellular network for a user equipment's (UE) data communication by passively sensing the load on the wireless LAN.

Background Art

Data communications of UEs are increasingly on rise. Video streaming, web browsing, text and multimedia messaging, etc. are examples of UE's data communications that are congesting the cellular air interface and its backhaul. Long Term Evolution (LTE) (which is based on Global System for Mobile communication (GSM)/GSM Evolution (EDGE) and Universal Mobile Telecommunications System (UMTS)/High Speed Packet Access (HSPA) network technologies) is a wireless communications standard that supports high-speed data for a UE. LTE has increased data capacity. However, cellular network operators are encouraging users of UEs to switch (offload) their bandwidth intensive applications to wireless LANs, such as WiFi networks, which can have a direct connection to a core backbone network such as a Public Data Network (PDN).

Cellular networks are evolving to Heterogeneous networks. A Heterogeneous network can include a macrocell (a cell in a cellular network that provides coverage using a cellular base station), a picocell (a small cellular base station covering a small area), a Femttocell (a small, low-power cellular base station, usually used in a home or small business), WiFi hotspots, relays, etc. Heterogeneous networks (HetNet), which connect different access technologies, can improve capacity and/or coverage. Many UEs automatically switch their data communications from a cellular network to a wireless LAN when they detect the wireless LAN. Although wireless LANs, such as WiFi networks, typically provide higher throughput than cellular networks, such as 3G (the 3rd Generation), however, user experience after switching to the wireless LAN can be unpredictable. A user's experience in the wireless LAN is a function of the "user load" on the network. The wireless LAN is a shared medium with limited effective resources per user. Therefore, UE can experience a better data communication on the cellular network, if the wireless LAN that UE has found is serving too many users, or pre-existing users with substantial bandwidth requirements. Conventionally, the switch between the cellular network and the wireless LAN occurs based on signal strength. Also, the user of the UE can manually disable or enable the wireless LAN option on the UE for a more predictable experience and battery life.

BRIEF DESCRIPTION OF THE DRAWINGS/FIGURES

The accompanying drawings, which are incorporated herein and form part of the specification, illustrate the present disclosure and, together with the description, further serve to explain the principles of the disclosure and to enable a person skilled in the relevant art(s) to make and use the disclosure.

The present disclosure will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Overview

Apparatus and methods are provided for switching between a wireless local area network (LAN) and a cellular network for a user equipment's (UE) data communication by passively sensing the load on the wireless LAN. According to a first embodiment, a method is disclosed that includes detecting an access point associated with a wireless LAN and receiving packets that are transmitted by other devices that are using the wireless LAN for communications. The method can further include examining the received packets to estimate a data load of the wireless LAN and selecting between the wireless LAN and a cellular network based on the estimated data load.

According to another embodiment, an apparatus is provided that includes a radio transceiver and a control logic. The radio transceiver is configured to transmit signals to a network device. The control logic is configured to detect an access point associated with a wireless LAN and receive packets that are transmitted by other devices that are using the wireless LAN for communications. The control logic is further configured to examine the received packets to estimate a data load of the wireless LAN and select between the wireless LAN and a cellular network based on the estimated data load.

Detailed Discussion

The following Detailed Description of the present disclosure refers to the accompanying drawings that illustrate exemplary embodiments consistent with this disclosure. The exemplary embodiments will so fully reveal the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein. Therefore, the detailed description is not meant to limit the present disclosure.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, the term "module" and the like, shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Terms like "user equipment," "mobile station," "mobile," "mobile device," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms may be utilized interchangeably in the subject specification and related drawings. Likewise, the terms "access point," "base station," "base transceiver station", "Node B." "evolved Node B (eNode B)," home Node B (HNB)," "home access point (HAP)," or the like, may be utilized interchangeably in the subject specification and drawings, and refer to a wireless network component or apparatus that serves and receives data, control, voice, video, sound, gaming, or substantially any data-stream or signaling-stream from a set of subscriber stations.

Figure 1:
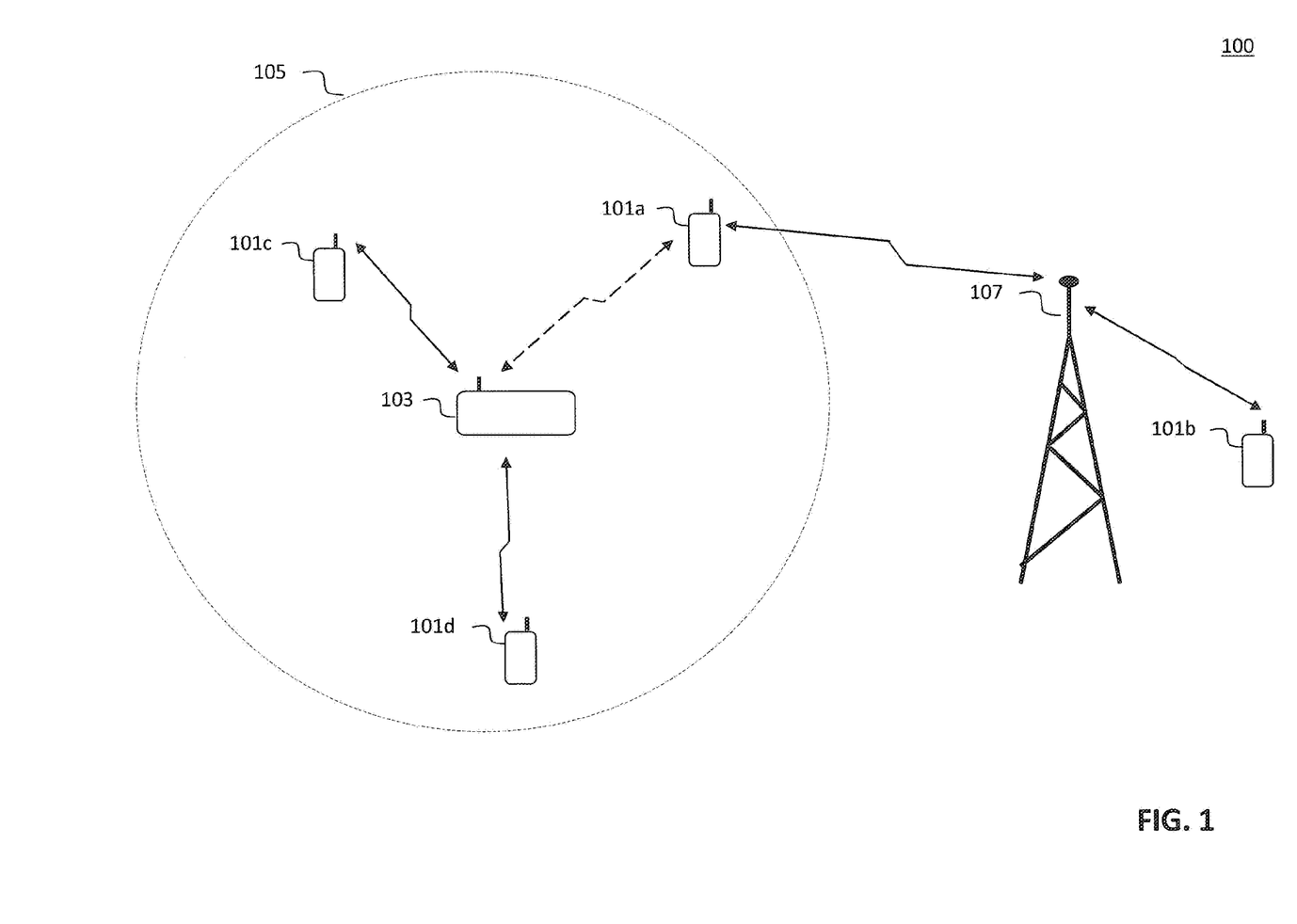
FIG. 1 illustrates a system, in accordance with an embodiment of the present disclosure.

FIG. 1 illustrates a system 100, according to an embodiment of the present disclosure. For example, system 100 illustrates user equipment (UE) 101a that communicates with a cellular network illustrated by wireless network device 107 such as a evolved Node B (enode B), a base station, or the like. According to one example, while UE 101a is in coverage area of wireless network device 107, UE 101a can also be or can move to be in coverage area 105 of access point 103 that is associated with a wireless LAN that can be connected to a Public Data Network (PDN). When UE 101a is in coverage area 105 of access point 103, UE 101a is configured to evaluate the wireless LAN provided by access point 103. By evaluating the wireless LAN, UE 101a can determine whether it would be better for UE 101a to switch (offload) its data session from the cellular network (provided by wireless network device 107) to the wireless LAN that is associated with the access point 103.

According to one example, the switch between the cellular network and the wireless LAN occurs based on the UE passively sensing the wireless LAN, evaluating the "load" of the wireless LAN, and a comparison of the evaluated "load" of the wireless LAN with corresponding parameters of the cellular network. If UE 101a (which can be, but is not limited to, a mobile phone, smartphone, personal digital assistant (PDA), etc.) determines that data communication over the wireless LAN is more suitable, UE 101a can switch its data communication from the cellular network to the wireless LAN. While the data session of UE 101a is on the wireless LAN, TIE 101a can periodically monitor and evaluate one or more parameters of the wireless LAN, compare the one or more parameters of the wireless LAN to link conditions on the cellular network, and decide whether to continue its data session on the wireless LAN or switch back to the cellular network.

According to one example, access point 103 provides a wireless LAN (e.g., a WiFi network) with coverage 105. Different parameters can affect the experience of a user, such as the user of UE 101a, when connected to access point 103. For example, the specific communications protocol (e.g., which version of IEEE 802.11) used by access point 103 affects user's experience. The number of users that share the access point, in addition to their bandwidth or data rate requirements, can affect the user's experience. Further, throughput of the network, data rate of the links, delays, quality of service support, etc. can also affect user's experience. Further, the throughput and/or data rate of any backhaul or PDN connected to the wireless network can also affect the user's experience.

In one embodiment, UE 101a detects access point 103 by, for example, examining a Beacon frame that is broadcast by access point 103. A Beacon frame is a management frame in IEEE 802.11 based wireless LANs that is transmitted periodically by access point 103 to broadcast the presence of the wireless LAN and includes information about the network. Alternatively or additionally, UE 101a detects access point 103 by, for example, detecting packets sent by access point 103 to UE 101a and/or other UEs, and/or by detecting packets transmitted by other UEs to access point 103. Instead of automatically switching its data communication from the cellular network to the wireless LAN supported by access point 103 (as in conventional methods), UE 101a passively senses the medium of the wireless LAN to intelligently decide whether or not to make the switch. By passively sensing the medium, UE 101a is not required to transmit any packets and is not required to connect to and stay on a network that provides a user experience worse than the cellular network, therefore, saving power. By passively sensing the medium, UE 101a can estimate one or more parameters ("load") associated with the wireless LAN, such as, but not limited to, a network type, received signal strength indicator (RSSI—that is a measurement of the power present in a received radio signal), number of users sharing the wireless medium, estimated throughput of the link if UE 101*a* was to connect to access point 103, the delay of its link, quality of service (QoS) support provided by the network, etc. After UE 101*a* estimates one or more parameters, UE 101*a* can compare the estimates to link conditions on the cellular network. UE 101*a* can then determine whether or not to switch to access point 103 based on this comparison.

Additionally or alternatively, while UE 101*a* is connected to access point 103 for data communication, UE 101*a* can periodically estimate one or more parameters of the wireless LAN and compare the parameters with link conditions on the cellular network to determine whether it is more suitable for UE 101*a* to stay on the wireless LAN or would be better to switch back to the cellular network for its data sessions. Therefore, instead of staying on the wireless LAN that does not provide suitable user experience, UE 101*a* can intelligently switch back to cellular network when needed.

Figure 2:
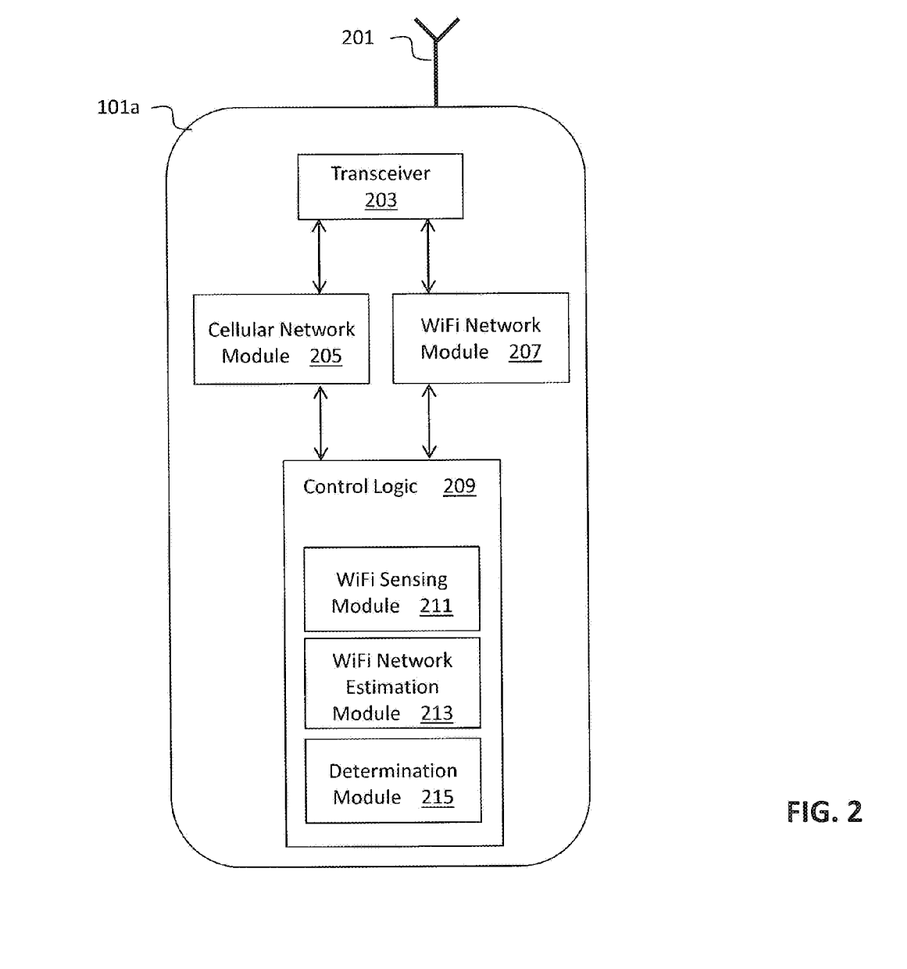
FIG. 2 illustrates a user equipment, in accordance with an embodiment of the present disclosure.

FIG. 2 illustrates a user equipment, in accordance with an embodiment of the present disclosure. In one example, UE 101*a* can include, but is not limited to, a transceiver 203 including a radio transmitter and receiver, a cellular network module 205, a WiFi network module 207, a control logic 209 (such as, but not limited to one or more WiFi sensing module 211, WiFi network estimation module 213, and determination module 215), and an antenna 201, all or some of which can be executed utilizing one or more processors. For example, the control logic 209 can be implemented using one or more processor(s) and/or state machine logic, or a combination thereof, programmed or implemented to have the functionality described herein. Although different modules are illustrated in FIG. 2, the disclosure is not so limited, as will be understood by those skilled in the arts. The modules can be implemented as part of control logic 209, can be combined in one or more modules, and can be implemented by software, hardware, or a combination thereof, etc.

According to one example, UE 101*a* is configured to use transceiver 203, cellular network module 205, and antenna 201 for communication with network device 107 of the a cellular network. For example, UE 101*a*, using cellular network module 205, transmits control packets, signaling messages, and/or data and/or voice packets to network device 107 and receives acknowledgments, signaling messages, and/or data and/or voice packets from device 107 through antenna 201, transceiver 203, and cellular network module 205. Cellular module 205 can provide an interface that properly formats (encodes/decodes) packets for communications with the associated cellular network.

Similarly, UE 101*a* is configured to use transceiver 203, WiFi network module 207, and antenna 201 for communication with access point 103 of a wireless LAN (such as a WiFi network). For example, UE 101*a*, using WiFi network module 205, transmits control packets, signaling messages, and/or data packets to access point 103 and receives acknowledgments, signaling messages, and/or data packets from access point 103 through antenna 201, transceiver 203, and WiFi network module 207. WiFi network module 207 can provide an interface that properly formats (encodes/decodes) packets for communications with the associated wireless LAN. Although separate modules for communications on cellular network and wireless LAN are illustrated, the disclosure is not so limited, as will be understood by those skilled in the arts and these modules can be combined in one or more modules.

Control logic 209, which includes one or more sensing module 211, network estimation module 213, and determination module 215, is configured to passively sense a wireless LAN, to evaluate the suitability of that network, to determine whether a switch between the cellular network and the wireless LAN is advisable, and to initiate the switch. According to one example, WiFi sensing module 211 is configured to detect a wireless LAN and collect information that is needed for estimating the "load" of the network and that is needed to make the switching determination. For example, sensing module 2011, using WiFi network module 207, can scan for presence of access point 103. In one example, sensing module 211 can detect the wireless LAN by examining a Beacon frame that is sent by access point 103; receiving and examining packets that are sent to UE 101*a* and/or other UEs by access point 103; and/or by receiving signaling messages from access point 103 and/or receiving packets sent by other UEs in the wireless LAN. By passively sensing the packets, sensing module 211 can examine these packets by reading information includes in these packets.

In one example, sensing module 211 can determine the "load" of the wireless LAN using information that is provided by access point 103. For example, in IEEE 802.11u (incorporated herein by reference in its entirety), which is a recent development on IEEE technical standards for wireless LANs, sensing module 211 can use Access Network Query Protocol (ANQP) to collect information regarding the wireless LAN. ANQP is a query and response protocol used by UE 101*a* to discover information, such as access point 103 operator's domain name; roaming partners; IP address type availability; and other metadata useful in UE's 101*a* network selection process. UE 101*a* can send a query message to access point 103 and receive information regarding the wireless LAN. The information received can be used by determination module 215 to determine whether or not to switch between the cellular network and the wireless LAN.

Additionally or alternatively, sensing module 211 can obtain RSSI of the wireless LAN, which is a measurement of the power present in a received radio signal, by passively monitoring and scanning the wireless LAN medium. Sensing module 211, using WiFi network module 207, can observe RSSI values associated with packets that sensing module 211 scans. The value(s) of RSSI can be sent to WiFi network estimation module 213. Estimation module 213 can use this information to estimate one or more parameters associated with the wireless LAN. For example, estimation module 213 can use the value(s) RSSI sensed by sensing module 211, to determine the signal strength of the wireless LAN.

Additionally or alternatively, sensing module 211 can examine the source and destination media access control (MAC) addresses of packets it receives. The wireless LAN is a shared medium so that packets transmitted (by access point 103 and/or other UEs in the network) can be received ("heard") by UE 101*a* that is passively sensing the medium, even though the packets are not addressed to the UE 101*a*. Sensing module 211, alone or in combination with estimation module 213, can determine the number of "active" UEs (e.g., UEs which are actively communicating with access point 103 or each other) by examining and cataloging the source and destination MAC addresses that are provided in each packet (for example, in the header of the packets.) To determine the number of "active" UEs, sensing module 211, alone or in combination with estimation module 213, determines the number of distinctive and unicast (e.g., unique and not multicast) MAC addresses. Multicast MAC transmissions are available to all UEs and therefore distinguished when trying to determine active UEs.

The number of active UEs in the wireless LAN is another parameter that is estimated by estimation module 213, which can be used to determine the "load" of the network. This estimation method is applicable both in a traditional AP-WLAN (where UEs communicate with each other through the access point (AP)) and in a WiFi Direct (where UEs can communicate with each other directly and not through the access point.) In each scenario, UEs are using a shared medium that can be heard by UE 101a and UEs are using source and destination MAC addresses in the packets they transmit and receive. UE 101a can monitor the medium for a given amount of time (a few seconds) to be able to effectively estimate the number of active users in the network. The given time can be a fixed amount or can be variable depending on the amount of traffic UE 101a senses on the medium.

According to one example, when UE 101a first determines the presence of access point 103, UE 101a examines the RSSI of the medium. If the UE 101a determines that the RSSI does not meet a threshold, UE 101a can decide not to switch to the wireless LAN (or if UE 101a is on the wireless LAN, UE 101 can decide to switch back to the cellular network.) If the UE determines that the RSSI meets the threshold (meaning that the signal strength is acceptable on the wireless LAN), before deciding to switch to the wireless LAN, UE 101a can estimate the number of UEs on the wireless LAN for consideration in the switching decision.

Additionally or alternatively, sensing module 211 can examine the wireless LAN medium and the packets transmitted thereon and determine a physical layer (PHY) data rate associated with each UE on the network. For example, sensing module 211 can examine the PHY level headers (such as Preamble/Physical Layer Convergence Protocol (PLCP) header in IEEE 802.11 packets) and infer the PHY data rate associated with each UE. Data rate of each UE is an indication how that UE uses the shared medium, and therefore, can be used to calculate expected throughput for UE 101a. In other words, a UE with a high data rate transmits it packets faster than another UE with a low data rate with same amount of packets to transmit, and therefore utilizes the shared medium for shorter time periods when transmitting.

Network estimation module 213 can use the PHY data rates of UEs and the estimated number of UEs to determine the expected throughput (e.g., the average rate of successful message delivery over a communication channel) of UE 101a if it joined the wireless network. For example, estimation module 213 can estimate the throughput using an "average cycle time" approach discussed in "Throughput Analysis of IEEE 802.11 Wireless LANs using Average Cycle Time Approach," K. Medepalli and F. A. Tobagi, Proceedings of IEEE Globecom 2005, incorporated herein by reference in its entirety. However, the disclosure is not so limited, as will be understood by those skilled in the arts. The present disclosure can include other methods to estimate the throughput. According to one example, estimation module 213 estimates the throughput by assuming that UE 101a has joined the wireless LAN and UE's 101a data rate is estimated based on the link's RSSI. In this example, estimation module 213 estimates the throughput it can get if it were to "hypothetically" join the wireless LAN. The throughput of its link in the wireless LAN is another parameter that is estimated by estimation module 213, which can be used to determine the "load" of the network.

Additionally or alternatively, estimation module 213 can estimate the delay of the UE's 101a link if UE 101a were to connect to the wireless LAN. In this example, estimation module 213 estimates the delay by dividing a packet size (which is a known value for the protocol used in the wireless LAN) by the estimated throughput. The estimated delay of its link in the wireless LAN is another parameter that can be used to determine the "load" of the network.

Additionally or alternatively, sensing module 211 can examine a Beacon frame that is sent by access point 103. Sensing module 211 can examine the Beacon frame and, alone or in combination with estimation module 213, can determine which communications protocol (e.g., media access control (MAC) and physical layer (PHY) specifications for implementing the wireless LAN) is used in the wireless LAN. For example, sensing module 211 and/or estimation module 213 can determine which of IEEE 802.11 standards are used in the network. For example, sensing module 211 and/or estimation module 213 can determine whether IEEE 802.11a, b, g, n, etc. is used in the wireless LAN. The communications protocol used in the network can limit the maximum throughput UE 101a can achieve if it were to switch to the wireless LAN. The network type is another parameter that can be used to determine the "load" of the network.

Additionally or alternatively, sensing module 211 and/or estimation module 213 can determine what level of quality of service (QoS) is provided by the wireless LAN. For example, per IEEE 802.11 standards, data and control frames can include a QoS control field that can indicate the QoS provided by the wireless LAN. The QoS in the wireless LAN is another parameter that can be used to determine the "load" of the network. The above-noted parameters that can be used to determine the "load" of the wireless LAN are provided as exemplary parameters and the disclosure is not so limited, as will be understood by those skilled in the arts. The present disclosure can include any other methods for UE 101a to passively sense the wireless LAN's medium and estimate other parameters that can be used by UE 101a to decide whether or not switch between the wireless LAN and the cellular network.

Determination module 215 can compare one or more of the parameters estimated by estimation module 213 with corresponding parameters/metrics of the cellular network and determine whether to switch between the networks. According to one example, the throughput of the cellular link provided by the cellular network is controlled mostly by the cellular network and therefore, the UE 101a can have a good estimate of the cellular link's throughput. Determination module 215 can compare the estimated throughput (e.g., calculated by estimation module 213) of the wireless LAN's link to the cellular link's throughput and make a decision accordingly. Additionally or alternatively, determination module 215 can compare the estimated delay and/or RSSI of the wireless LAN's link to cellular link's to make the switching decision.

Additionally or alternatively, determination module 215 can determine whether to switch between networks based on network type determination made by, for example, sensing module 211 and/or estimation module 213. For example, if sensing module 211 and/or estimation module 213 determined that the wireless LAN implements IEEE 802.11b, determination module 215 can decide to stay on cellular network (or switch back to cellular network) since IEEE 802.11b has a low maximum achievable throughput.

Additionally or alternatively, determination module 215 can determine whether to switch between networks based on the QoS determined by sensing module 211 and/or estimation module 213. For example, if UE 101a is used for a QoS sensitive application (e.g., voice over LTE), determination module 215 can compare the QoS of the wireless LAN with the required QoS for the application and determine whether to switch between the networks. For example, if determination module 215 determines that the wireless LAN does not support the needed QoS for a particular application, determination module 215 can decide that UE 101a will stay on the cellular network (or switch back to cellular network.)

According to one example, an operator of the cellular network can influence the determination of switching between the networks. According to this example, the operator can set one or more thresholds to be used for the comparison of the one or more parameters (metrics) of the wireless LAN and the cellular network. The operator can send the one or more thresholds to the UEs. In one example, open mobile alliance (OMA) device management (DM) protocol can be used for the management of UEs. OMA-DM can support configuration, enabling and disabling features of UEs; changes to setting and parameters of UEs; providing new software and/or fixes; error reports and UE's status query; etc. For example, a threshold can be set by the operator of the cellular network for the throughput of the link. When determination module 215 compares the estimated throughput of the wireless LAN's network to the throughput of the cellular network, determination module 215 makes the switch between the networks if the difference between the throughputs is greater than the set threshold. According to one example, the threshold can take into consideration various characteristics of the UE, for example, the mobility of UE 101a. Stated other way, UE 101a will switch from the cellular network to the wireless LAN if the expected throughput that UE 101a will get on the wireless LAN exceeds the expected throughput on the cellular network by a given threshold. The given threshold can used to account for the fact that UE 101a can move, which can affect UE's experience on the wireless LAN. One or more set thresholds can be used for one or more other parameters used by determination module 215.

If determination module 215 determines that a switch between the networks is suitable, cellular network module 205 and/or WiFi network module 207 are informed to make the switch between networks and resume the data communication on the new network. When determination module 215 determines to switch to the wireless LAN and UE 101a switches to the wireless LAN, sensing module 211, estimation module 213 and determination module 215 can continue to passively sense the wireless LAN and can trigger a switch back to the cellular network if/when the quality of data communications on the wireless LAN goes below a threshold.

Figure 3:
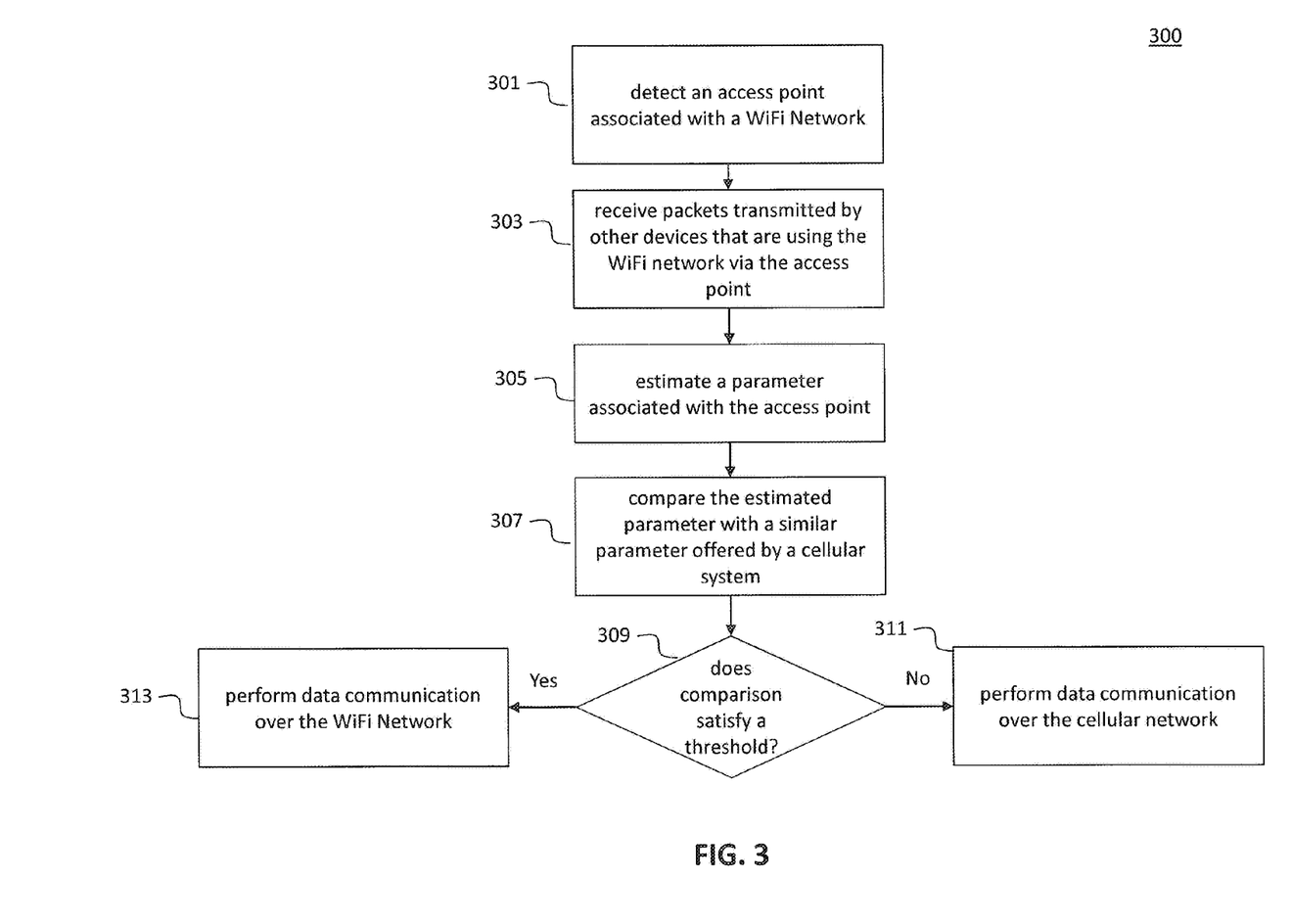
FIG. 3 is a flowchart illustrating a method, in accordance with an embodiment of the present disclosure.

FIG. 3 is a flowchart depicting a method 300, according to an embodiment of the present disclosure. For example, method 300 can be performed by UE 101a (e.g., cellular network module 205, WiFi network module 207, and control logic 209). It is to be appreciated not all steps may be needed to perform disclosure provided herein. Further, some of the steps may be performed simultaneously, or in a different order than that shown in FIG. 3, as will be understood by those skilled in the art. Reference is made to UE 101a in FIGS. 1 and 2 merely for convenience of discussion. Other systems may be used to perform the method as will be understood by those skilled in the arts.

In step 301, UE 101a can detect an access point (e.g., access point 103) that is associated with a wireless LAN (e.g., a WiFi network.) In one example, UE 101a (using, for example, sensing module 211) can examine a Beacon frame that is sent by access point 103. In this example, Beacon frames are transmitted periodically by access point 103 to broadcast the presence of the wireless LAN and the access point and include information about the network.

In step 303, UE 101a can receive one or more packets transmitted within the wireless LAN. For example, UE 101a can receive packets that are transmitted by access point 103 to UE 101a and/or other UEs connected to access point 103. Additionally or alternatively, UE 101a can receive packets that are transmitted by other UEs destined to access point 103, UE 101a, and/or other UEs. According to one example, detecting the presence of access point 103 can be based on receiving these packets and examining them.

In step 305, UE 101a estimates one or more parameters associated with the wireless LAN and access point 103 based on the packets UE 101a has passively received. The one or more parameters estimated by UE 101a can include, but is not limited to, RSSI of the communication link on the wireless LAN, number of users in the network, the throughput of the link, the delay of the link, the QoS provided by the network, and/or the type of the wireless LAN. In step 307, UE 101a compares the one or more estimated parameters with one or more corresponding metrics for the cellular link. The corresponding metrics of the cellular link can be provided to UE 101a by the operator of the cellular network and/or can be estimated by UE 101a.

In step 309, a determination can be made whether the comparison in step 307 satisfies one or more thresholds. According to one example, the operator of the cellular network can provide one or more thresholds to UE 101a to influence the conditions at which the switch between networks occurs. For example, after UE 101a compares a first estimated parameter of the wireless LAN to a first corresponding metric of the cellular network, UE 101a further compares the difference between the first estimated parameter and the first metric to a first threshold. In this example, UE 101a will switch the networks if the difference between corresponding metric of the wireless LAN and the cellular network is greater than a threshold.

If the comparison between the estimated parameter of the wireless LAN and the corresponding metric of the cellular network does not meet the threshold, in step 311, UE 101a will continue its data communication (or will switch back its data communication) on the cellular network. Otherwise, in step 313, UE 101a will switch its data communication (or will continue its data communication) on the wireless LAN.

Figure 4:
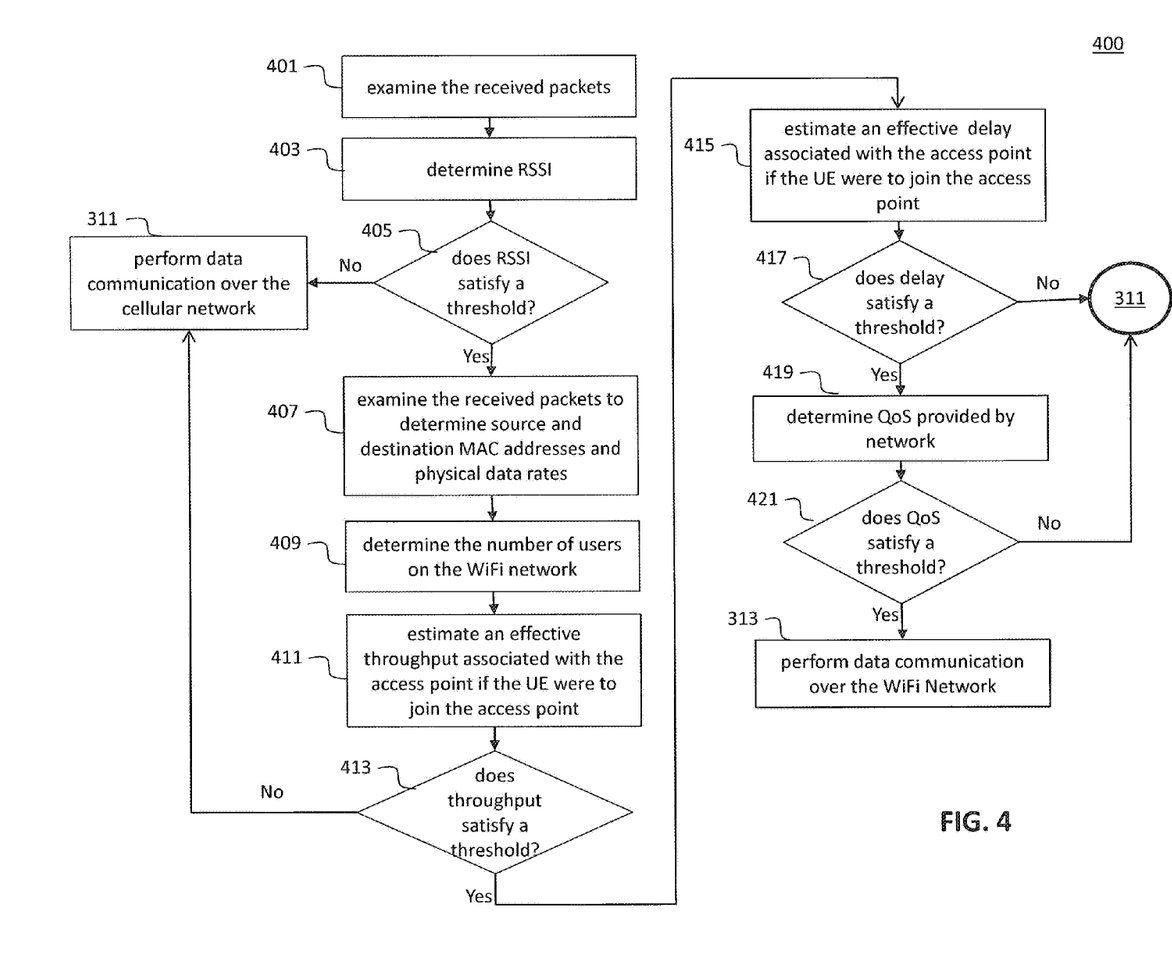
FIG. 4 is another flowcharts illustrating a method, in accordance with an embodiment of the present disclosure.

FIG. 4 is a flowchart depicting method 400, according to an embodiment of the present disclosure. In one example, these methods further define estimating one or more parameters 305 of method 300. For example, method 400 can be performed by UE 101a (e.g., cellular network module 205, WiFi network module 207, and control logic 209). It is to be appreciated not all steps may be needed to perform disclosure provided herein. Further, some of the steps may be performed simultaneously, or in a different order than that shown in FIG. 4, as will be understood by those skilled in the art. Reference is made to UE 101a in FIGS. 1 and 2 merely for convenience of discussion. Other systems may be used to perform the method as will be understood by those skilled in the arts.

According to an embodiment, estimating one or more parameters associated with access point 103, as discussed in step 305 of FIG. 3, can include examining the received packets in step 401 and determining RSSI and/or the type of the wireless LAN, in step 403. According to this example, UE 101a can observe RSSI values associated with packets that UE 101a scans. In one example, RSSI can indicate the maximum throughput UE 101a can achieve on the wireless LAN if it was the only UE in the network. UE 101a can use this information to estimate one or more parameters associated with the wireless LAN. For example, UE 101a can use the value(s) RSSI sensed to determine the signal strength of the wireless LAN. In step 405, UE 101 can compare the determined RSSI value with a threshold. If the determined RSSI does not meet the threshold, which can be set by the operator of the cellular network, in step 311. UE 101a can perform its data communication on the cellular network. If the requirement of step 405 is satisfied, UE 101a can decided to perform its data communication of the wireless LAN or can continue with further examining the wireless LAN to determine if data communications should be performed on the wireless LAN.

In step 407, the received packets are examined to determine source and destination MAC addresses included in the received packets. Each packet and/or frame transmitted on the wireless LAN (e.g., a wireless LAN that support an IEEE 802.11 standard) can be divided into specific sections, such as, a MAC header, a payload, and a frame check sequence (FCS). Each section includes one or more bytes that include information regarding that section or other sections of the frame. For example, an 802.11 frame can have up to four address fields, which can include a MAC address of the source, a MAC address of the destination. Additionally, in step 407, UE 101a can determine PHY data rates of corresponding UEs. For example, the PHY level headers (such as Preamble/PLCP header in IEEE 802.11 packets) of the received packets can be examined and the PHY data rates can be determined from these PHY level headers.

Based on the number of distinctive and unicast MAC addresses, in step 409, UE 101a can determine how many users are using the wireless LAN. In one embodiment, broadcast addresses are excluded from being counted as an active user. The estimated number of active users in the network can be used as one estimated parameter for comparison decisions 307 and 309 of FIG. 3. Additionally or alternatively, in step 411, UE 101a can use the PHY data rates and the estimated number of UEs to determine the throughput of UE's 101a in the network. In one embodiment, the throughput estimation can be based on "average cycle time" approach discuss in "Throughput Analysis of IEEE 802.11 Wireless LANs using Average Cycle Time Approach," K. Medepalli and F. A. Tobagi, Proceedings of IEEE Globecom 2005, incorporated herein by reference in its entirety. However, the disclosure is not so limited, as will be understood by those skilled in the arts and can include any other methods to estimate the throughput. According to one example, UE 101a estimates the throughput by assuming that UE 101a has joined the wireless LAN and UE's 101a data rate is estimated based on the link's RSSI.

According to one example, when "average cycle time" approach is used, the effective throughput of the system, assuming UE 101a is connected to the wireless LAN, is calculated as following:

$$S = \frac{P}{H + (P+O)\frac{1}{N}\sum_{j=1}^{N}\frac{1}{R_j} + \frac{E[B]}{N} + \frac{E[C]}{N_C}}$$

According to this example, P illustrates average packet size (e.g., 1500 bytes internet frame). The packet size distribution is known based on the protocol used in the wireless LAN and UEs in the wireless network use the same average packet size. Parameter H illustrates the size of the MAC header used in each packet, that can also be standard. Parameter O illustrates other higher layer overhead size. For example, the size of headers used by other layers, such as TCP (transmission control protocol) layer, RTP (real-time transport protocol) layer, etc. are accounted for in H.

Parameter $R_j$ represents the physical data rate of user j. N represents the total number of users in the network, including UE 101a, that, for example, has been estimated by UE 101a. E[B] is the expected time spent in back-off by different users. E[B] is a function of total number of users in the network (N, including UE 101a) and therefore, can be determined by UE 101a based on the number of users estimated in step 409. E[C] is an average channel time wasted because of collision on the channel, which can be calculated by UE 101a based on estimated number of users and other parameters that UE 101a can determine from the received packets, such as PHY data rates, packet size, the expected back-off time, etc. Finally, $N_c$ represents number of users involved in a collision.

The estimated throughput of UE's 101a link in the wireless LAN can be used as one estimated parameter for comparison decisions 307 and 309 of FIG. 3. For example, in step 413, UE 101a can compare the estimated effective throughput with a threshold and perform the data communication over the cellular network if the threshold is not satisfied. If the threshold is satisfied, UE 101a can perform its data communication on the wireless LAN in step 313, or decide to further examine the wireless LAN.

If the threshold is satisfied, and UE 101a continues with examining the wireless LAN, in step 415, UE 101a can use the estimated throughput and a packet size (which is a known value for the protocol used in the wireless LAN) to determine an estimated delay for its link if UE 101a were to connect to the wireless LAN. According to this example, the delay is estimated by dividing the known packet size by the estimated throughput. The estimated delay of UE's 101a link in the wireless LAN can be used as one estimated parameter for comparison decisions 307 and 309 of FIG. 3. For example, in step 417, UE 101a can compare the estimated delay with a threshold and perform the data communication over the cellular network if the threshold is not satisfied. If the threshold is satisfied, UE 101a can perform its data communication on the wireless LAN in step 313, or decide to further examine the wireless LAN.

If the threshold is satisfied, and UE 101a continues with examining the wireless LAN, in step 419, UE 101a can determine QoS provided by network. UE 101a can use the received packets to determine the QoS supported by the wireless LAN. According to one example, the packets/frames received by UE 101a can include a QoS control field that provides the QoS supported by the network. This QoS information can include quantitative measures of some aspects of the network such as error rates, bandwidth, throughput, transmission delay, availability, jitter, etc. The estimated QoS of the network can be used as one estimated parameter for comparison decisions 307 and 309 of FIG. 3. For example, in step 421, UE 101a can compare the determined QoS of the wireless LAN with one or more thresholds for one or more applications supported by UE 101a. If the one or more thresholds are not satisfied, UE 101a can perform the data communication over the cellular network. If the threshold is satisfied, UE 101a can perform its data communication on the wireless LAN in step 313, or decide to further examine the wireless LAN.

Figure 5:
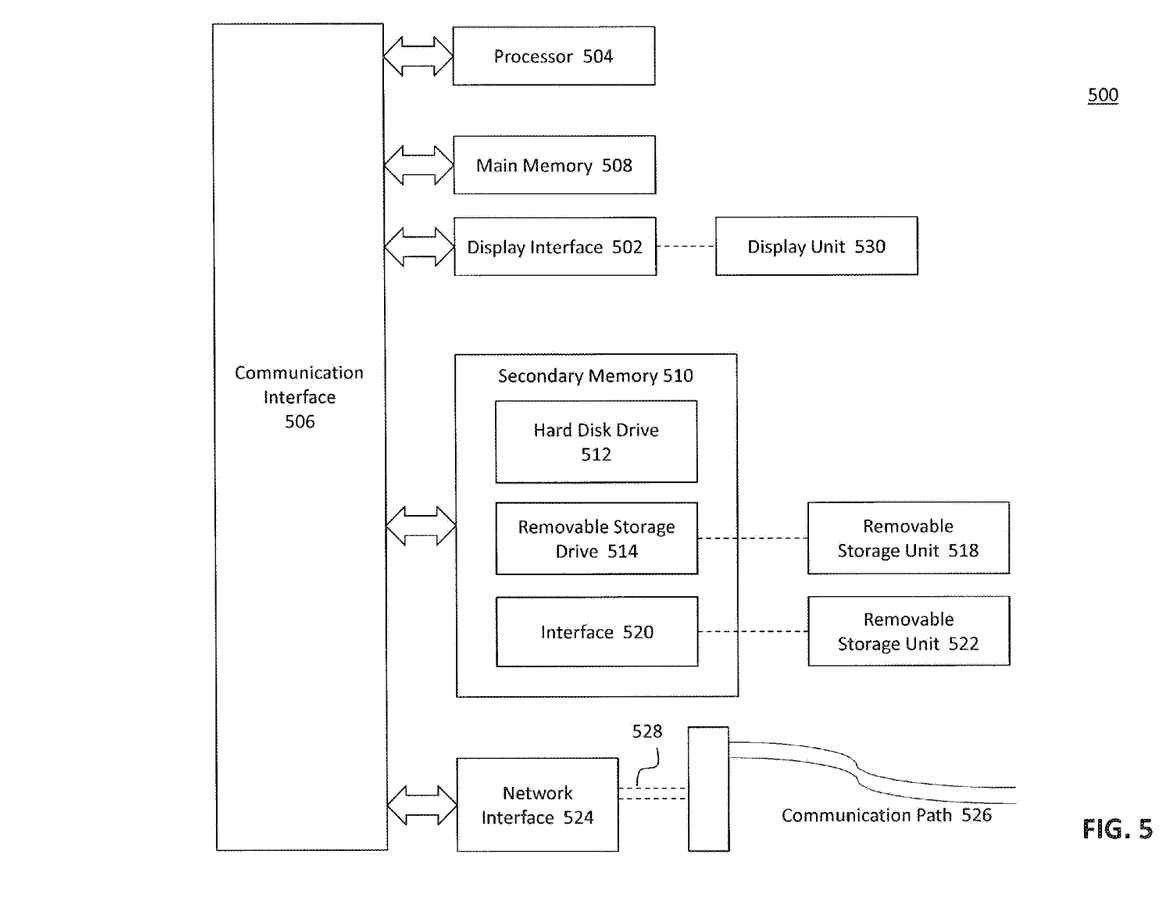
FIG. 5 illustrates a computer system that can be utilized to implement one or more embodiments of the present disclosure.

Various aspects of the present disclosure can be implemented by software, firmware, hardware, or a combination thereof. FIG. 5 illustrates an example computer system 500 in which the present disclosure, or portions thereof, can be implemented as computer-readable code. For example, all or portions of methods 300 and 400 and control logic 209 can be implemented by computer system 500. Various embodiments of the disclosure are described in terms of this example computer system 500. After reading this description, it will become apparent to a person skilled in the relevant art how to implement the disclosure using other computer systems and/or computer architectures.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, preferably random access memory (RAM), and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. that is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 that allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals that may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Signals carried over communications path 526 can also embody the logic described herein. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the present disclosure as discussed herein. In particular, the computer programs, when executed, enable processor 504 to implement the processes of the present disclosure. Accordingly, such computer programs represent controllers of the computer system 500. Where the disclosure is implemented using software, the software may be stored in a computer program product and loaded into computer system 500 using removable storage drive 514, interface 520, hard drive 512 or communications interface 524.

The disclosure is also directed to computer program products comprising software stored on any computer useable medium. Such software, when executed in one or more data processing device, causes a data processing device(s) to operate as described herein. Embodiments of the disclosure employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

The exemplary embodiments described herein are provided for illustrative purposes, and are not limiting. Other exemplary embodiments are possible, and modifications may be made to the exemplary embodiments within the spirit and scope of the disclosure.

It is to be appreciated that the Detailed Description section, and not the Abstract section, is intended to be used to interpret the claims. The Abstract section may set forth one or more, but not all exemplary embodiments, of the disclosure, and thus, are not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus the disclosure should not be limited by any of the above-described exemplary embodiments. Further, the claims should be defined only in accordance with the following claims and their equivalents.

What is claimed is:

1. A method of signal processing in a user equipment (UE) to select between a wireless local area network (LAN) and a cellular network for data transmission, comprising:
   detecting, by the UE, an access point associated with the wireless LAN;

passively sensing, by the UE, packets that are transmitted by other UEs that are using the wireless LAN and are not addressed to the UE;
examining, by the UE, the passively sensed packets to estimate a data load of the wireless LAN; and
selecting between the wireless LAN and the cellular network based on the estimated data load.

2. The method of claim 1, further comprising:
comparing the estimated data load of the wireless LAN with a corresponding parameter of the cellular network; and
selecting one of the wireless LAN or the cellular network for the data transmission based on the comparison.

3. The method of claim 2, further comprising:
determining a difference between the estimated data load of the wireless LAN and the corresponding parameter of the cellular network;
comparing the difference with a threshold; and
selecting one of the wireless LAN or the cellular network for the data transmission based on the comparison of the difference and the threshold.

4. The method of claim 1, further comprising:
determining a quality of service provided by the wireless LAN;
comparing the determined quality of service with a quality of service required by an application supported by the UE; and
selecting one of the wireless LAN or the cellular network for the data transmission based on the comparison.

5. The method of claim 1, further comprising:
transmitting data, by the UE, on the selected network; and
periodically updating the estimated data load, and changing networks if warranted.

6. A method of signal processing in a user equipment (UE) to select between a wireless local area network (LAN) and a cellular network for data transmission, comprising:
detecting, by the UE, an access point associated with the wireless LAN;
receiving, by the UE, packets that are transmitted by other devices that are using the wireless LAN;
examining, by the UE, the received packets to estimate a data load of the wireless LAN, wherein the estimating a data load comprises:
determining a number of active users on the wireless LAN based on a number of different media access control (MAC) addresses identified for the received packets; and
determining data rates of the active users based on packet headers of the received packets associated with the active users; and
selecting between the wireless LAN and the cellular network based on the estimated data load.

7. The method of claim 6, wherein the estimating a data load further comprises:
determining a prospective data rate of the UE if the UE were to access the wireless LAN; and
estimating an expected throughput for the UE if the UE were to access the wireless LAN, based on the determined prospective data rate of the UE and the data rates of the active users.

8. The method of claim 7, wherein the estimating a data load further comprises:
determining an expected delay of the UE if the UE were to access the wireless LAN based on the estimated expected throughput for the UE.

9. The method of claim 7, wherein the determining a prospective data rate of the UE is based on a detected Received Signal Strength Indicator (RSSI) associated with the access point.

10. The method of claim 6, wherein the determining data rates of the active users comprises determining data rates of the active users by examining preamble/Physical Layer Convergence Protocol (PLCP) headers of 802.11 packets associated with the active users.

11. A user equipment (UE), comprising:
a radio transceiver configured to transmit signals to a wireless local area network (LAN); and
a control logic configured to:
detect an access point associated with the wireless LAN:
passively sense packets that are transmitted by other UEs that are using the wireless LAN and are not addressed to the UE;
examine the passively sensed packets to estimate a data load of the wireless LAN; and
select between the wireless LAN and a cellular network based on the estimated data load.

12. The UE of claim 11, wherein the control logic is further configured to:
compare the estimated data load of the wireless LAN with a corresponding parameter of the cellular network; and
select one of the wireless LAN or the cellular network for the data transmission based on the comparison.

13. The UE of claim 12, wherein the control logic is further configured to:
determine a difference between the estimated data load of the wireless LAN and the corresponding parameter of the cellular network;
compare the difference with a threshold; and
select one of the wireless LAN or the cellular network for the data transmission based on the comparison of the difference.

14. The UE of claim 11, wherein the control logic is further configured to:
determine a quality of service provided by the wireless LAN;
compare the determined quality of service with a quality of service required by an application supported by the UE; and
select one of the wireless LAN or the cellular network for the data transmission based on the comparison.

15. The UE of claim 11, wherein the control logic is further configured to:
initiate transmission of data on the selected network; and
periodically update the estimated data load, and change networks if warranted.

16. A user equipment (UE), comprising:
a radio transceiver configured to transmit signals to a wireless local area network (LAN); and
a control logic configured to:
detect an access point associated with the wireless LAN;
receive packets that are transmitted by other devices that are using the wireless LAN;
examine the received packets to estimate a data load of the wireless LAN by:
determining a number of active users on the wireless LAN based on a number of different media access control (MAC) addresses identified for the received packets; and determining data rates of the active users based on packet headers of the received packets associated the active users; and select between the wireless LAN and a cellular network based on the estimated data load.

17. The UE of claim 16, wherein to estimate the data load, the control logic is further configured to:

determine a prospective data rate for prospective data transmissions of the UE over the wireless LAN; and estimate an expected throughput for the prospective data transmissions, based on the determined prospective data rate and the data rates of the active users.

18. The UE of claim 17, wherein to estimate the data load, the control logic is further configured to:

determine an expected delay for the data transmissions if the UE were to access the wireless LAN based on the estimated expected throughput for the data transmissions.

19. The UE of claim 17, wherein the prospective data rate of the UE is based on a detected Received Signal Strength Indicator (RSSI) associated with the access point.

20. The UE of claim 16, wherein to determine the data rates of the active users, the control logic is further configured to examine preamble/Physical Layer Convergence Protocol (PLCP) headers of 802.11 packets associated with the active users.

* * * * *